US009182762B2

(12) United States Patent
Yabushita et al.

(10) Patent No.: US 9,182,762 B2
(45) Date of Patent: Nov. 10, 2015

(54) AUTONOMOUS MOVING BODY, ITS CONTROL METHOD, AND CONTROL SYSTEM

(75) Inventors: Hidenori Yabushita, Toyota (JP); Kazuhiro Mima, Toyota (JP); Yoshiaki Asahara, Obu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 62 days.

(21) Appl. No.: 12/866,555

(22) PCT Filed: Jan. 19, 2009

(86) PCT No.: PCT/JP2009/050638
§ 371 (c)(1),
(2), (4) Date: Aug. 6, 2010

(87) PCT Pub. No.: WO2009/098927
PCT Pub. Date: Aug. 13, 2009

(65) Prior Publication Data
US 2010/0324771 A1    Dec. 23, 2010

(30) Foreign Application Priority Data

Feb. 7, 2008    (JP) .................................. 2008-027337

(51) Int. Cl.
*G05D 1/02* (2006.01)
*G01C 21/26* (2006.01)
*G05D 1/00* (2006.01)

(52) U.S. Cl.
CPC .............. *G05D 1/024* (2013.01); *G05D 1/0246* (2013.01); *G01C 21/26* (2013.01); *G05D 1/00* (2013.01); *G05D 1/027* (2013.01); *G05D 1/0261* (2013.01); *G05D 1/0274* (2013.01); *G05D 1/0278* (2013.01)

(58) Field of Classification Search
None
See application file for complete search history.

(56) References Cited

U.S. PATENT DOCUMENTS

| 5,390,125 A | 2/1995 | Sennott et al. |
| 5,610,815 A | 3/1997 | Gudat et al. |

(Continued)

FOREIGN PATENT DOCUMENTS

| JP | 62-34784 A | 2/1987 |
| JP | 05127747 A | 5/1993 |

(Continued)

OTHER PUBLICATIONS

Office Action dated Oct. 25, 2013 in U.S. Appl. No. 13/126,860.

(Continued)

*Primary Examiner* — Ryan Zeender
*Assistant Examiner* — Denisse Ortiz Roman
(74) *Attorney, Agent, or Firm* — Kenyon & Kenyon LLP

(57) ABSTRACT

To provide an autonomous moving body capable of moving with efficiency along a path toward a travel end point while avoiding a collision with a moving obstacle, its control method, and its control system. An autonomous moving body in accordance with the present invention includes means to create a traveling path of the autonomous moving body that extends from a travel start point to a travel end point, means to calculate a point at which a moving obstacle located within the moving area crosses the created traveling path of the autonomous moving body as a collision prediction point, means to calculate a first passage time period during which the moving obstacle passes through the collision prediction point, and means to calculate a second passage time period during which the autonomous moving body passes through the collision prediction point. Further, if at least a part of the second passage time period overlaps the first passage time period, the traveling speed of the autonomous moving body is adjusted so that the second passage time period does not overlap the first passage time period.

6 Claims, 8 Drawing Sheets

(56) References Cited

U.S. PATENT DOCUMENTS

| | | |
|---|---|---|
| 5,625,559 A | 4/1997 | Egawa |
| 6,067,572 A | 5/2000 | Jensen et al. |
| 6,098,107 A | 8/2000 | Narvaez-Guarnieri et al. |
| 6,212,443 B1 | 4/2001 | Nagata et al. |
| 6,236,360 B1 | 5/2001 | Rudow et al. |
| 6,405,132 B1 * | 6/2002 | Breed et al. .................... 701/301 |
| 6,604,005 B1 * | 8/2003 | Dorst et al. ..................... 700/56 |
| 6,678,582 B2 | 1/2004 | Waled |
| 6,904,335 B2 | 6/2005 | Solomon |
| 7,079,943 B2 | 7/2006 | Flann et al. |
| 7,398,136 B2 * | 7/2008 | Higaki et al. ................. 700/255 |
| 7,539,563 B2 | 5/2009 | Yang et al. |
| 7,584,020 B2 | 9/2009 | Bruemmer et al. |
| 7,620,477 B2 | 11/2009 | Bruemmer |
| 7,684,894 B2 * | 3/2010 | Sakai et al. ................... 700/245 |
| 7,742,841 B2 | 6/2010 | Sakai et al. |
| 7,844,393 B2 | 11/2010 | Takizawa |
| 7,869,946 B2 | 1/2011 | Couckuyt et al. |
| 7,957,837 B2 | 6/2011 | Ziegler et al. |
| 7,979,174 B2 | 7/2011 | Fregene et al. |
| 8,060,271 B2 | 11/2011 | Dolgov et al. |
| 8,078,399 B2 | 12/2011 | Ariyur et al. |
| 8,121,749 B1 | 2/2012 | Agrawal et al. |
| 8,280,574 B2 | 10/2012 | Yabushita et al. |
| 8,442,714 B2 | 5/2013 | Matsukawa et al. |
| 2004/0117079 A1 | 6/2004 | Hulden |
| 2004/0158355 A1 | 8/2004 | Holmqvist et al. |
| 2004/0193365 A1 | 9/2004 | Kokojima et al. |
| 2006/0095170 A1 | 5/2006 | Yang et al. |
| 2006/0149465 A1 | 7/2006 | Park et al. |
| 2006/0167601 A1 | 7/2006 | Henning et al. |
| 2007/0276541 A1 | 11/2007 | Sawasaki |
| 2008/0009965 A1 | 1/2008 | Bruemmer et al. |
| 2008/0009966 A1 | 1/2008 | Bruemmer et al. |
| 2008/0059015 A1 | 3/2008 | Whittaker et al. |
| 2009/0018712 A1 | 1/2009 | Duncan et al. |
| 2009/0043440 A1 * | 2/2009 | Matsukawa et al. ............ 701/25 |
| 2009/0043489 A1 | 2/2009 | Weidner |
| 2009/0069938 A1 | 3/2009 | Nishimura et al. |
| 2009/0105939 A1 | 4/2009 | Dolgov et al. |
| 2009/0192683 A1 | 7/2009 | Kondou et al. |
| 2009/0306881 A1 | 12/2009 | Dolgov et al. |
| 2010/0082194 A1 | 4/2010 | Yabushita et al. |
| 2010/0283632 A1 | 11/2010 | Kawabata et al. |
| 2011/0054689 A1 | 3/2011 | Nielsen et al. |
| 2012/0035797 A1 | 2/2012 | Oobayashi et al. |
| 2012/0083960 A1 | 4/2012 | Zhu et al. |

FOREIGN PATENT DOCUMENTS

| | | |
|---|---|---|
| JP | 06138941 A | 5/1994 |
| JP | 06265637 A | 9/1994 |
| JP | 06289929 A | 10/1994 |
| JP | 7-104062 A | 4/1995 |
| JP | 7-104602 A | 4/1995 |
| JP | 9-251320 A | 9/1997 |
| JP | 2001324343 A | 11/2001 |
| JP | 2002287824 A | 10/2002 |
| JP | 2004157829 A | 6/2004 |
| JP | 2004-299001 A1 | 10/2004 |
| JP | 2005032196 A | 2/2005 |
| JP | 2006163558 A | 6/2006 |
| JP | 3879860 | 11/2006 |
| JP | 2007-213111 A | 8/2007 |
| JP | 2007249632 A | 9/2007 |
| JP | 2009042845 A | 2/2009 |
| WO | 2008005661 A2 | 1/2008 |

OTHER PUBLICATIONS

Office Action dated Dec. 21, 2012 in U.S. Appl. No. 13/126,860.
Office Action dated Jun. 7, 2012 in U.S. Appl. No. 13/126,860.
Office Action dated Oct. 4, 2011 in U.S. Appl. No. 12/442,234.
Office Action dated Mar. 15, 2012 in U.S. Appl. No. 12/442,234.
Final Office Action issued on Apr. 8, 2014, in U.S. Appl. No. 13/126,860.
Advisory Action issued on Jun. 27, 2014, in U.S. Appl. No. 13/126,860.
Weihong et al, "A quick intelligent control system for a mobile robot to avoid collision with moving obstacles", Microsystems Technologies; Micro and Nanosystems information storage and processing systems, Springer, Berlin, DE, vol. 11, No. 8-10, Aug. 1, 2005, pp. 596-576.
Office Action dated Jan. 8, 2015 in U.S. Appl. No. 13/126,860.

* cited by examiner ately closer to 45
AUTONOMOUS MOVING BODY, ITS CONTROL METHOD, AND CONTROL SYSTEM This is a 371 national phase application of PCT/JP2009/050638 filed 19 Jan. 2009, claiming priority to Japanese Patent Application No. JP 2008-027337 filed 7 Feb. 2008, the contents of which are incorporated herein by reference.

TECHNICAL FIELD

The present invention relates to an autonomous moving body that avoids a moving obstacle, its control method, and a control system.

BACKGROUND ART

In recent years, the development of vehicles, walking robots, and the likes that move autonomously in a predetermined moving area such as a limited area indoors or outdoors, i.e., the so-called "autonomous moving bodies" has been pursued. An autonomous moving body like this not only recognizes the own position of the autonomous moving body within a moving area, but also creates a traveling path, along which the autonomous mobbing body attempts to move, in advance or in real-time.

If an obstacle exists in the moving area when the autonomous moving body creates a traveling path, the autonomous moving body creates a traveling path in such a manner that the autonomous moving body does not collide with the obstacle. Note that examples of the obstacle include a fixed obstacle that is fixed and thus do not move, and a moving obstacle that moves such as people and other robots. With regard to the fixed obstacle, by creating a traveling path while defining the vicinity of the obstacle as a prohibited area at the start, any problem can be prevented from occurring even in cases where the traveling path is created in a successive manner. However, the moving obstacle causes various problems because it moves. For example, if such a moving obstacle has a large moving speed, the position of the moving obstacle changes whenever a new traveling path is created, and therefore the traveling path is widely changed. As a result, there is a possibility the autonomous moving body could not track the path completely and could collide with the obstacle. In particular, if a moving obstacle moves so as to come relatively closer to the autonomous moving body, the risk of collision increases.

Patent document 1 discloses an autonomous moving device that stores a predetermined maximum speed, an acceleration, and a deceleration as traveling control conditions, uses a traveling control target area that is defined ahead of the moving device in the traveling direction in advance, and changes the setting of the traveling speed in the traveling direction based on the control conditions only when an obstacle is detected within the traveling control area. In the autonomous moving device disclosed in Patent document 1, since the moving device does not react to any obstacle located outside the traveling control area, the number of reactions to objects other than obstacles on the passageway such as walls can be reduced. Therefore, it is possible to perform efficient traveling at a higher speed in comparison to cases where the traveling control area is not used.

Further, Patent document 2 discloses a bipedal walking robot that determines whether the walking of the robot should be stopped or not based on the relative distance and the relative angle between the robot and another moving body. Then, when the walking should be stopped, the bipedal robot performs control so that the moving distance that the bipedal robot moves before coming to a standstill becomes equal to or shorter than a predetermined distance. In the bipedal walking robot disclosed in Patent document 2, since the bipedal walking robot can stop at or within a predetermined distance when the robot comes closer to another moving body, the collision between the robot and the moving body can be avoided.

[Patent Document 1]
Japanese Patent No. 3879860
[Patent Document 2]
Japanese Unexamined Patent Application Publication No. 2004-299001

DISCLOSURE OF INVENTION

Technical Problem

However, in the autonomous moving device disclosed in Patent document 1, when the moving device detects an obstacle within the traveling control target area, the traveling speed is controlled in a reflexive manner. That is, it cannot calculate the optimal traveling speed to avoid the collision with the obstacle. Further, in the bipedal walking robot disclosed in Patent document 2, its object is to stop the movement of the bipedal walking robot to above the collision with an obstacle. Therefore, it cannot move along a path with efficiency while avoiding the obstacle.

As described above, according to the conventional technique, the optimal traveling speed to avoid an obstacle cannot be calculated. Therefore, it has been impossible to achieve both the obstacle avoidance and the optimal path planning simultaneously. Therefore, there has been a problem that the moving body cannot move with efficiency along a path from a travel start point to a travel end point at the optimal traveling speed to avoid a collision with a moving obstacle.

The present invention has been made to solve such a problem, and an object thereof is to provide an autonomous moving body capable of moving with efficiency along a path toward a travel end point while avoiding a collision with a moving obstacle, its control method, and its control system.

Technical Solution

An autonomous moving body in accordance with the present invention is an autonomous moving body that starts traveling from a travel start point located within a moving area and arrives at a travel end point located within the moving area, including: means to create a traveling path of the autonomous moving body, the traveling path extending from the travel start point to the travel end point; means to calculate a point at which a moving obstacle located within the moving area crosses the created traveling path of the autonomous moving body as a collision prediction point; means to calculate a first passage time period during which the moving obstacle passes through the collision prediction point; and means to calculate a second passage time period during which the autonomous moving body passes through the collision prediction point, wherein if at least a part of the second passage time period overlaps the first passage time period, a traveling speed of the autonomous moving body is adjusted so that the second passage time period does not overlap the first passage time period.

In this way, a point at which a moving obstacle crosses the traveling path of the autonomous moving body is calculated as a collision prediction point, and the speed of the autonomous moving body is adjusted so that the time period during which the moving obstacle passes through the collision prediction point does not overlap the time period during which the autonomous moving body passes through the collision prediction point. By doing so, the autonomous moving body can continue to travel while avoiding the moving obstacle, and therefore both the obstacle avoidance and the optimal path planning can be achieved simultaneously. Accordingly, the autonomous moving body can travel with efficiency toward the travel end point along the path while avoiding a collision with the moving obstacle.

Further, if at least a part of the second passage time period overlaps the first passage time period, the autonomous moving body may decrease the traveling speed of the autonomous moving body so that the second passage time period does not overlap the first passage time period. By decreasing the traveling speed of the autonomous moving body in this way, the autonomous moving body can pass through the collision prediction point after the moving obstacle passed through the collision prediction point. Accordingly, when a collision with a moving obstacle is predicted, the autonomous moving body does not need to perform abrupt acceleration to avoid the obstacle, thus enabling safer traveling.

Further, if at least a part of the second passage time period overlaps the first passage time period, the autonomous moving body may calculate the traveling speed of the autonomous moving body to which the autonomous moving body decelerates based on the collision prediction point and the latest time point of the second passage time period. By calculating the traveling speed that is used by the autonomous moving body to arrive at the collision prediction point based on the time point at which the moving obstacle has completely passed through the collision prediction point, the traveling speed to avoid the moving obstacle with efficiency can be easily calculated.

Further, if at least a part of the second passage time period overlaps the first passage time period, the autonomous moving body may decrease or increase the traveling speed of the autonomous moving body so that the second passage time period does not overlap the first passage time period. By decreasing or increasing the traveling speed of the autonomous moving body in this way, the autonomous moving body may pass through the collision prediction point after the moving obstacle passed through the collision prediction point, or may complete the passage of the collision prediction point before the moving obstacle arrives at the collision prediction point. Therefore, even when the moving speed of the moving obstacle or the like is changed, the autonomous moving body can cope with the moving obstacle in a more flexible manner.

Further, if at least a part of the second passage time period overlaps the first passage time period, the autonomous moving body may calculate the traveling speed of the autonomous moving body to which the autonomous moving body decelerates based on the collision prediction point and the latest time point of the second passage time period, and/or may calculate the traveling speed of the autonomous moving body to which the autonomous moving body accelerates based on the collision prediction point, the size of the moving obstacle, and the earliest time point of the second passage time period. By calculating the traveling speed to which the autonomous moving body decelerates or accelerates, the traveling speed to avoid the moving obstacle with efficiency can be easily calculated.

Further, the means to calculate a first passage time period during which the moving obstacle passes through the collision prediction point may expand the first passage time period according to the degree of the risk of the moving obstacle at the collision prediction point. By expanding the first passage time period according to the degree of the risk of the moving obstacle, the autonomous moving body can move past the moving obstacle with a larger margin as they pass each other at the collision prediction point.

Further, after the moving obstacle passed through the collision prediction point, the autonomous moving body may change its speed from the adjusted traveling speed to a predetermined traveling speed and travel at the predetermined traveling speed. By restoring its speed to the predetermined speed and traveling at the predetermined speed after avoiding the moving obstacle in this manner, the autonomous moving body can travel more efficiently along the path while avoiding the collision with the moving obstacle.

Further, the means to calculate a point at which the moving obstacle crosses the traveling path of the autonomous moving body may include means to calculate a movement prediction path of the moving obstacle based on current position information of the moving obstacle and movement direction information, and means to calculate an intersection point of the traveling path of the autonomous moving body and the calculated movement prediction path of the moving obstacle as a collision prediction point.

Further, the means to calculate a first passage time period during which the moving obstacle passes through the collision prediction point may include means to calculate a moving speed of the moving obstacle based on current position information of the moving obstacle, and means to calculate a first passage time period during which the moving obstacle passes through the collision prediction point based on the collision prediction point, the calculated moving speed of the moving obstacle, and the size of the moving obstacle.

Further, the means to calculate a second passage time period during which the autonomous moving body passes through the collision prediction point may calculate a second passage time period during which the autonomous moving body passes through the collision prediction point based on the collision prediction point, the traveling speed of the autonomous moving body, and the size of the autonomous moving body.

A control method of an autonomous moving body in accordance with the present invention is a control method of an autonomous moving body that starts traveling from a travel start point located within a moving area and arrives at a travel end point located within the moving area, the control method including: a step of creating a traveling path of the autonomous moving body, the traveling path extending from the travel start point to the travel end point; a step of calculating a point at which a moving obstacle located within the moving area crosses the created traveling path of the autonomous moving body as a collision prediction point; a step of calculating a first passage time period during which the moving obstacle passes through the collision prediction point; and a step of calculating a second passage time period during which the autonomous moving body passes through the collision prediction point, wherein if at least a part of the second passage time period overlaps the first passage time period, a traveling speed of the autonomous moving body is adjusted so that the second passage time period does not overlap the first passage time period.

A control system of an autonomous moving body in accordance with the present invention is a control system of an autonomous moving body that starts traveling from a travel start point located within a moving area and arrives at a travel end point located within the moving area, the control system including: means to create a traveling path of the autonomous moving body, the traveling path extending from the travel start point to the travel end point; means to calculate a point at which a moving obstacle located within the moving area crosses the created traveling path of the autonomous moving body as a collision prediction point; means to calculate a first passage time period during which the moving obstacle passes through the collision prediction point; and means to calculate a second passage time period during which the autonomous moving body passes through the collision prediction point, wherein if at least a part of the second passage time period overlaps the first passage time period, a traveling speed of the autonomous moving body is adjusted so that the second passage time period does not overlap the first passage time period.

Advantageous Effects

According to the present invention, an object is to provide an autonomous moving body capable of moving with efficiency along a path toward a travel end point while avoiding a collision with a moving obstacle, its control method, and its control system.

EXPLANATION OF REFERENCE

1 FLOOR PORTION
10 AUTONOMOUS MOVING BODY
10A AUTONOMOUS MOVING BODY MAIN BODY
11 WHEEL
12 CASTER
13 DRIVING UNIT (MOTOR)
14 COUNTER
15 CONTROL UNIT
15A STORAGE AREA
16 EXTERNAL SENSOR
17 ANTENNA
100 AUTONOMOUS MOVING BODY CONTROL SYSTEM

S TRAVEL START POINT
G TRAVEL END POINT
D MOVING DIRECTION
B MOVING OBSTACLE
P COLLISION PREDICTION POINT
R MOVING PATH
F AREA
Rb OBSTACLE AREA
EX MOVEMENT TRACK

BEST MODE FOR CARRYING OUT THE INVENTION

First Exemplary Embodiment

An autonomous moving body in accordance with a first exemplary embodiment includes means to create a traveling path of the autonomous moving body that extends from a travel start point to a travel end point, means to calculate a point at which a moving obstacle located within the moving area crosses the traveling path of the autonomous moving body as a collision prediction point, means to calculate a first passage time period during which the moving obstacle passes through the collision prediction point, and means to calculate a second passage time period during which the autonomous moving body passes through the collision prediction point. Further, if at least a part of the second passage time period overlaps the first passage time period, the traveling speed of the autonomous moving body is adjusted so that the second passage time period does not overlap the first passage time period.

In this way, a point at which a moving obstacle crosses the traveling path of the autonomous moving body is calculated as a collision prediction point, and the speed of the autonomous moving body is adjusted so that the time period during which the moving obstacle passes through the collision prediction point does not overlap the time period during which the autonomous moving body passes through the collision prediction point. That is, since the autonomous moving body changes its traveling speed so as to avoid the timing at which the moving obstacle crosses the path, the autonomous moving body can continue to travel along the traveling path while appropriately avoiding the moving obstacle at the optimal speed. Therefore, both the obstacle avoidance and the optimal path planning can be achieved simultaneously. Therefore, the autonomous moving body can travel with efficiency toward the travel end point along the path while avoiding any collision with the moving obstacle.

Figure 1:
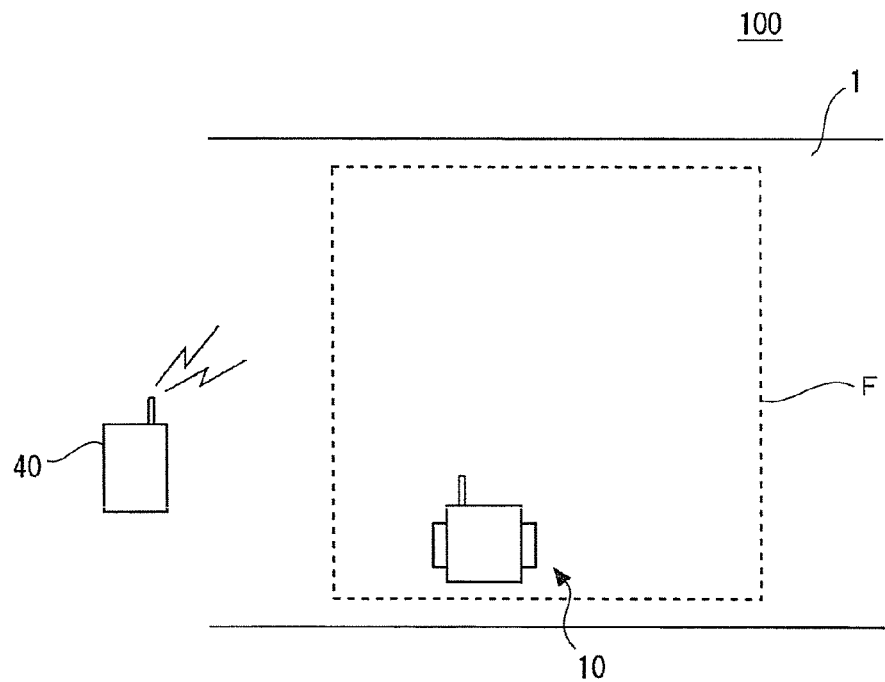
FIG. 1 is a schematic overall view of an autonomous moving body control system in accordance with a first exemplary embodiment of the present invention.

An autonomous moving body in accordance with a first exemplary embodiment is explained hereinafter with reference to the drawings. FIG. 1 schematically shows an exemplary embodiment of an autonomous moving body control system 100 in which an autonomous moving body 10, which acts as an autonomous moving body, moves in a limited area F (area enclosed by broken lines), which serves as a moving area, on a floor portion 1 based on a signal supplied from a control unit 15. Although no object is illustrated in the area F on the floor portion 1 in FIG. 1, fixed obstacles and/or moving obstacles detected by the external sensor as well as already-known fixed obstacles exist in the area F. Therefore, the autonomous moving body 10 needs to avoid these obstacles.

Figure 2:
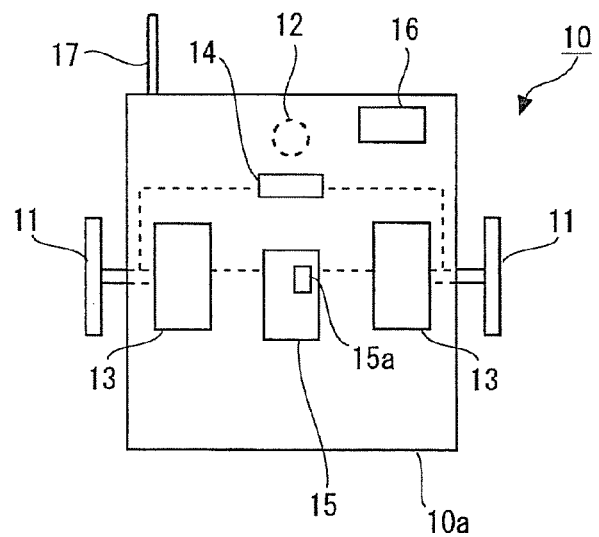
FIG. 2 is a schematic view of a vehicle as an autonomous moving body in accordance with a first exemplary embodiment of the present invention.

As shown in FIG. 2, the autonomous moving body 10 is a two-opposed-wheel type vehicle including a box-shaped autonomous moving body main body 10a, a pair of opposed wheels 11, and a caster 12, in which the autonomous moving body main body 10a is horizontally supported by these wheels 11 and the caster 12. Further, in the autonomous moving body main body 10a, the autonomous moving body 10 includes driving units (motors) 13 that drive the respective wheels 11, a counter 14 used to detect the number of revolutions of the wheels, and a control unit 15 that generates a control signal(s) used to drive the wheels and transmits the generated control signal to the driving units 13. Furthermore, in a storage area 15a, such as a memory, that is provided as a storage unit inside the control unit 15, a traveling speed and a traveling direction of the autonomous moving body 10 as well as a control program used to control a traveling distance of the autonomous moving body 10 based on the control signal are stored. The above-described traveling speed and traveling distance are obtained based on the number of revolutions of the wheels 11 detected by the counter 14.

Further, an external sensor 16 that recognizes an obstacle or the like appearing in the traveling direction is fixed on the front of the autonomous moving body main body 10a. Therefore, information such as a still image and/or a moving image recognized by this external sensor 16 is input to the control unit 15, and as a result, the traveling direction, the traveling speed, and the like of the vehicle are determined in accordance with the control program. The external sensor 16 may be constructed by a sensor that detects lasers reflected on an obstacle or the like, or a CCD camera.

Further, an antenna 17 used to recognize the position of the autonomous moving body 10 itself is provided on the top of the autonomous moving body main body 10a. For example, the autonomous moving body 10 can recognize its own position accurately by receiving position information from a GPS (not shown) or the like and analyzing the position information in the control unit 15.

The autonomous moving body 10 having the configuration like this can performs various moving actions such as strait traveling, curved traveling (turning), backward traveling, pinwheeling (pivotal movement centered on the midpoint between both wheels) by independently controlling the driving amount of each of the pair of the wheels 11. Further, the autonomous moving body 10 arrives at a specified destination within the area F by creating a traveling path to the destination and moving so as to track the traveling path according to a command from the control unit 15 that specifies an externally-supplied destination place.

A grid map that is obtained by drawing imaginary grid lines connecting grid points arranged at roughly regular intervals d (e.g., 10 cm) throughout the entire shape of the area F on the floor portion 1 is stored in the storage area 15a provided inside the control unit 15. As described previously, the autonomous moving body 10 transforms position information obtained from a GPS or the like into its own position on this grid map, and thereby recognizes its own position on the grid map. A place corresponding to the own position of the autonomous moving body 10, a travel end point, i.e., the destination, and the traveling direction of the autonomous moving body 10 at the travel end point are specified on the grid map. The control unit 15 creates a traveling path from a travel start point, i.e., its own position specified on the grid map to a travel end point, i.e., the destination, and moves according to the created traveling path.

Figure 3:
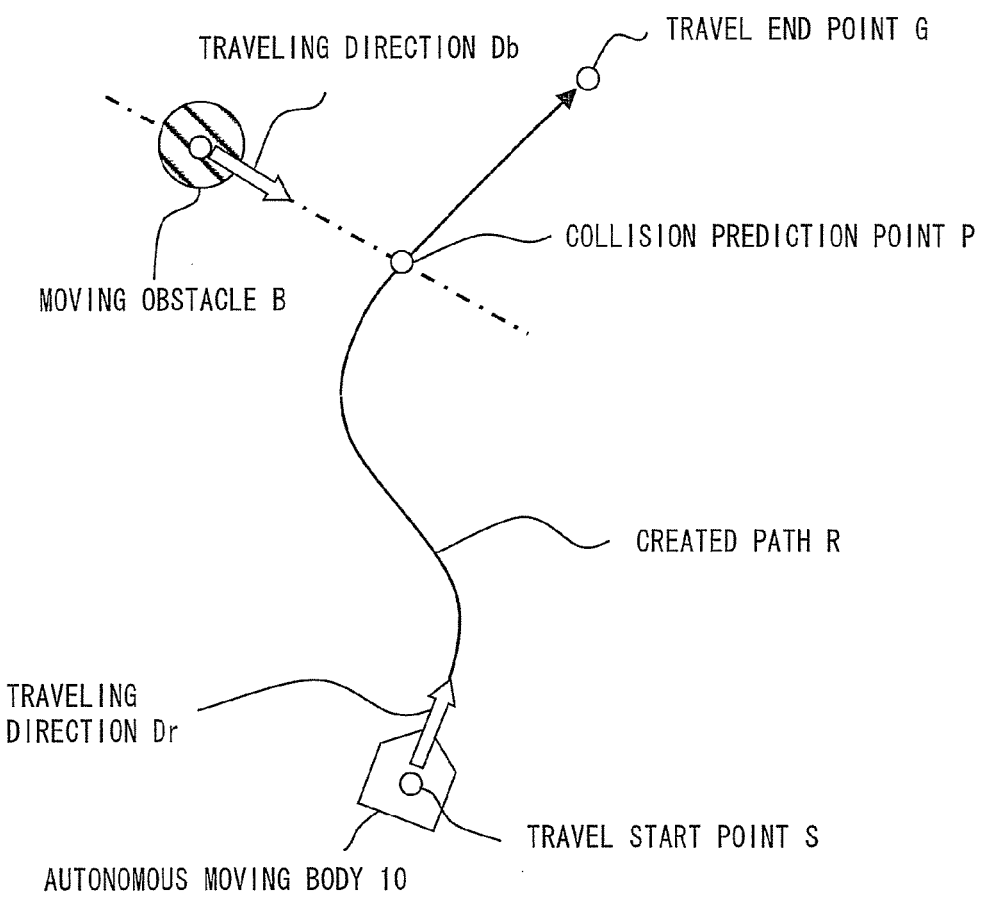
FIG. 3 shows movement tracks of a moving obstacle and an autonomous moving body in accordance with a first exemplary embodiment of the present invention.

Next, a control method of an autonomous moving body in a case where a moving obstacle exists between the travel start point and the travel end point is explained with reference to FIGS. 3 and 4. A moving obstacle B exists in an example shown in FIG. 3. The moving obstacle B crosses the traveling path R along which the autonomous moving body 10 travels at a collision prediction point P. The autonomous moving body 10 in accordance with the first exemplary embodiment changes its traveling speed so that the time period during which the autonomous moving body 10 passes through the collision prediction point P does not overlap the time period during which the moving obstacle B passes through the collision prediction point P.

Figure 4:
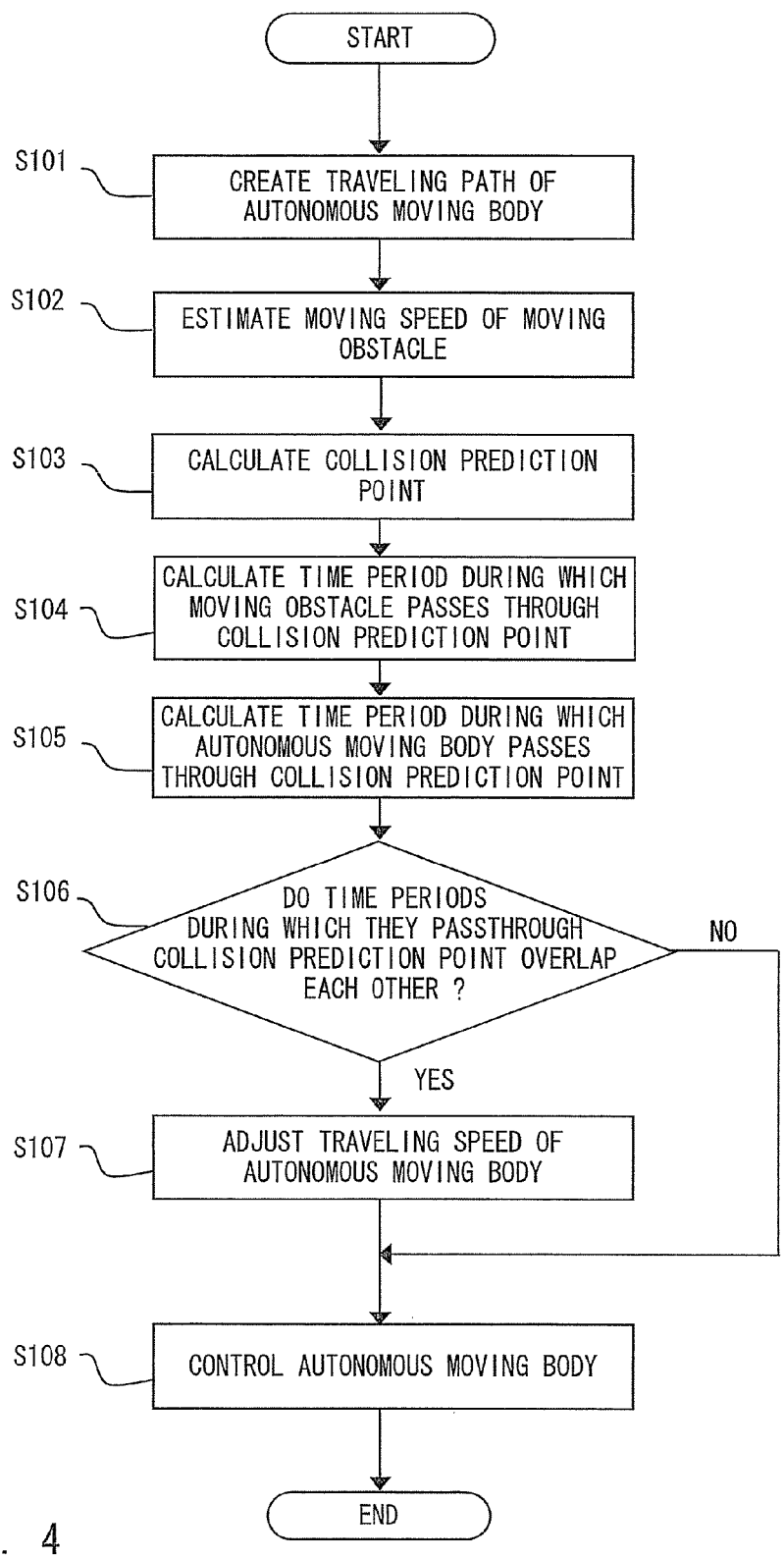
FIG. 4 is a flowchart showing an outline of control processing of an autonomous moving body in accordance with a first exemplary embodiment of the present invention.

FIG. 4 is a flowchart showing an outline of control processing of the autonomous moving body. Firstly, the control unit 15 creates a traveling path of the autonomous moving body 10 that extends from a travel start point S to a travel end point G (step S101). As for the path creation method, publicly-known path creation methods can be applied. For example, the traveling path may be created by using the A* (A-star) path finding method. The created traveling path R is stored in the storage area 15a.

Next, the control unit 15 recognizes the moving obstacle B and estimates its moving speed (step S102). More specifically, the control unit 15 first compares environment map data stored in the storage area 15a, which is used as known information, with measurement data obtained by the external sensor 16, and recognizes measurement data that does not exist in the map data as a moving obstacle B. Further, the control unit 15 stores the position information of the recognized moving obstacle B in the storage area 15a. Then, the control unit 15 estimates a moving speed of the center of gravity of the moving obstacle B. Specifically, the control unit 15 first calculates the position information of the center of gravity of the moving obstacle B. Next, the control unit 15 compares the position of the center of gravity of the moving obstacle B that was calculated at the timing earlier by one control cycle with the position of the center of gravity of the moving obstacle B that is calculated at the current timing to calculate the distance the moving obstacle has moved. Then, the control unit 15 calculates the speed of each moving obstacle B by dividing this distance by the control cycle.

Next, the control unit 15 calculates a point at which the moving obstacle B crosses the created traveling path R as a collision prediction point P (step S103). More specifically, the control unit 15 first calculates a movement prediction path along which the moving obstacle B is expected to move based on the current position information and the moving direction information as well as the moving speed of the moving obstacle B. For example, the movement prediction path of the moving obstacle B may be a straight line that extends from the current position of the moving obstacle B to the traveling direction Db and the opposite direction. Then, the control unit 15 calculates the intersection point of the created traveling path R of the autonomous moving body 10 and the calculated movement prediction path of the moving obstacle B as a collision prediction point P. This collision prediction point P does not take the moving speeds of the autonomous moving body 10 and the moving obstacle B into consideration, and is calculated based only on the traveling path R and the movement prediction path. Therefore, it does not predict their collision in a precise manner. Further, if the rotational component of the moving speed of the moving obstacle B is approximated to zero, the movement prediction path becomes a straight line. However, if the rotational component is not zero, the movement prediction path becomes an arc.

Next, the control unit 15 calculates a first passage time period during which the moving obstacle B passes through the collision prediction point P (step S104). More specifically, the control unit 15 calculates a distance from the current position of the moving obstacle B to the collision prediction point P. Then, the control unit 15 calculates a time T1 that the moving obstacle B takes to arrive at the collision prediction point P by dividing this distance by the current speed of the moving obstacle B. Further, the control unit 15 calculates a time ΔT1 that the moving obstacle B takes from when the moving obstacle B arrives at the collision prediction point P to when the moving obstacle B has completely passed through the collision prediction point P by dividing the size of the moving obstacle B by the current speed of the moving obstacle B. Then, the control unit 15 calculates a time T2 at which the moving obstacle B has completely passed through the collision prediction point P by adding the time ΔT1 to the time T1 that the moving obstacle B takes to arrive at the collision prediction point P (i.e., T2=T1+ΔT1) In this way, the control unit 15 calculates the time period (from T1 to T2) from when the moving obstacle B arrives at the collision prediction point P to when the moving obstacle B has completely passed through the collision prediction point P, that is, the first passage time period.

Next, the control unit 15 calculates a second passage time period during which the autonomous moving body 10 passes through the collision prediction point P (step S105). More specifically, the control unit 15 calculates a distance from the current position of the autonomous moving body 10 to the collision prediction point P. Then, the control unit 15 calculates a time T4 that the autonomous moving body 10 takes to arrive at the collision prediction point P by dividing this distance by the current speed of the autonomous moving body 10. Further, the control unit 15 calculates a time ΔT4 that the autonomous moving body 10 takes from when the autonomous moving body 10 arrives at the collision prediction point P to when the autonomous moving body 10 has completely passed through the collision prediction point P by dividing the size of the autonomous moving body 10 by the current speed of the autonomous moving body 10. Then, the control unit 15 calculates a time T5 at which the autonomous moving body 10 has completely passed through the collision prediction point P by adding the time ΔT4 to the time T4 that the autonomous moving body 10 takes to arrive at the collision prediction point P (i.e., T5=T4+ΔT4) In this way, the control unit 15 calculates the time period (from T4 to T5) from when the autonomous moving body 10 arrives at the collision prediction point P to when the autonomous moving body 10 has completely passed through the collision prediction point P, that is, the second passage time period.

Next, the control unit 15 determines whether or not at least a part of the second passage time period calculated in the step S105 overlap the first passage time period calculated in the step S104 (step S106). That is, it is determined whether or not the time period (from T4 to T5) from when the autonomous moving body 10 arrives at the collision prediction point P to when the autonomous moving body 10 has completely passed through the collision prediction point P overlaps the time period (from T1 to T2) from when the moving obstacle B arrives at the collision prediction point P to when the moving obstacle B has completely passed through the collision prediction point P. As a result of the determination, if any part of the second passage time period does not overlap the first passage time period, the process proceeds to a step S108.

On the other hand, when at least a part of the second passage time period overlaps the first passage time period in the result of the determination in the step S106, the control unit 15 adjusts the traveling speed of the autonomous moving body 10 so that the second passage time period does not overlap the first passage time period (step S107). When at least a part of the second passage time period overlaps the first passage time period, it is expected that when the moving obstacle B crosses the collision prediction point P, the autonomous moving body 10 also passes through the collision prediction point P at the same moment. Therefore, the autonomous moving body 10 adjusts its own traveling speed so that the autonomous moving body 10 moves so as to avoid the time period during which the moving obstacle B passes through the collision prediction point P. Note that the calculation method of the traveling speed to avoid the collision with the moving obstacle B is explained later.

The control unit 15 controls the autonomous moving body 10 by generating a control signal(s) used to drive the wheels based on the adjusted traveling speed and the created traveling path information, and outputting the generated control signal to the driving units 13 (S108). In this way, the autonomous moving body 10 moves so as to track the traveling path R specified by the traveling path information while avoiding the moving obstacle B.

Figure 5:
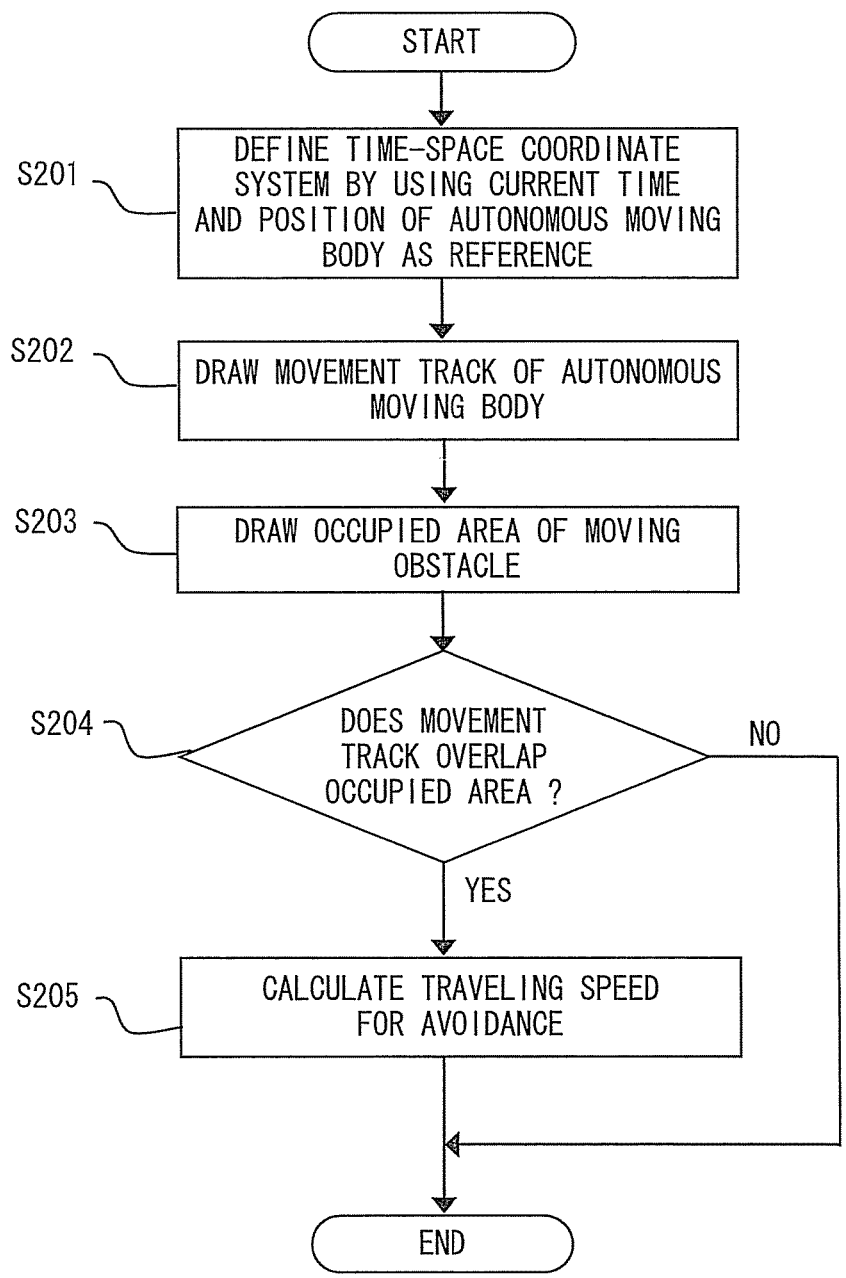
FIG. 5 is a flowchart showing traveling speed calculation processing of an autonomous moving body in accordance with a first exemplary embodiment of the present invention.
Figure 6A:
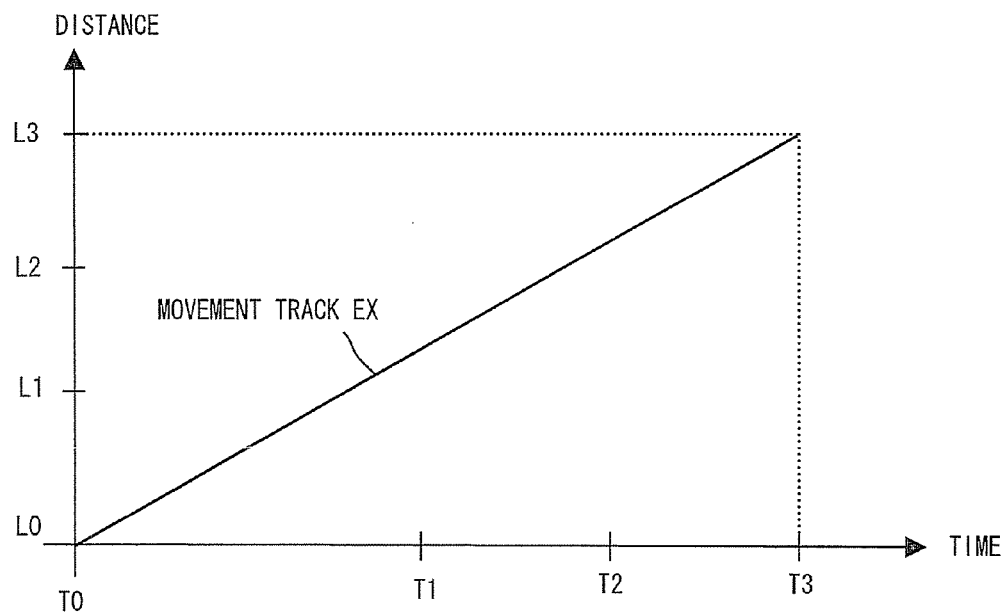
FIGS. 6A and 6B show movement tracks of a moving obstacle and an autonomous moving body in accordance with a first exemplary embodiment of the present invention.
Figure 6B:
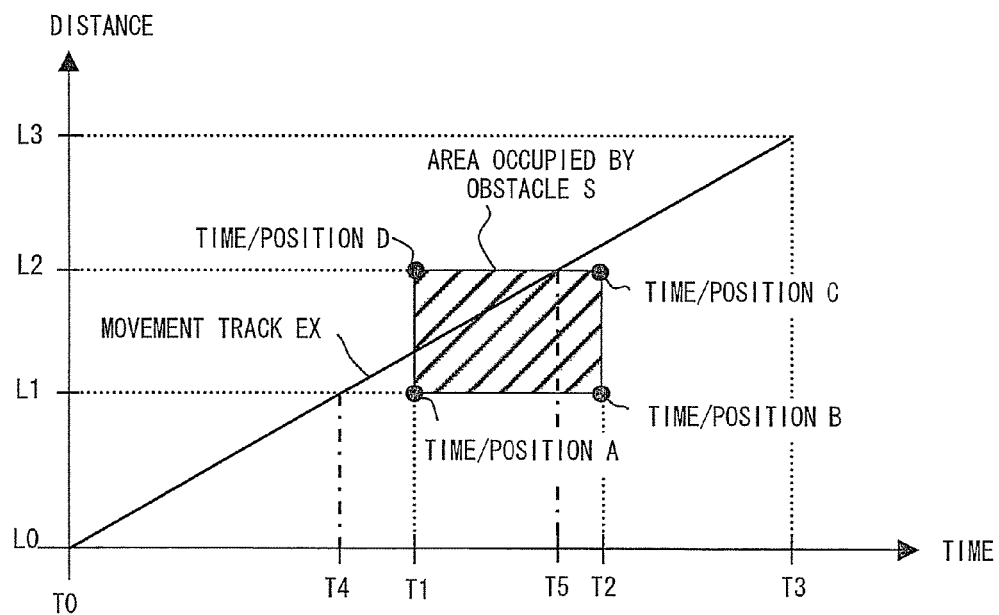
Figure 7A:
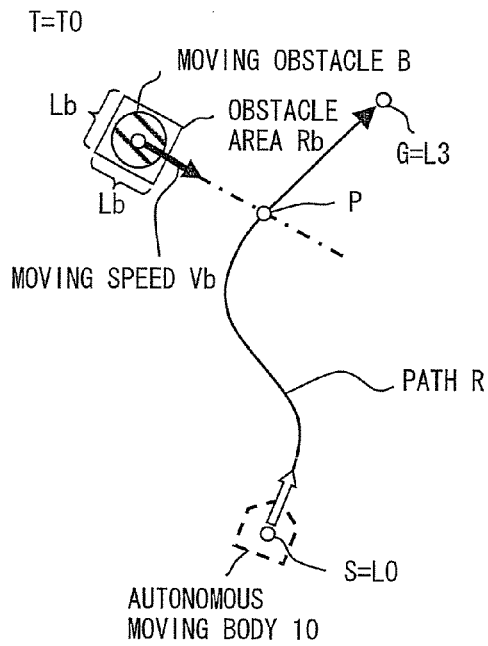
FIGS. 7A to 7D are diagrams for explaining an aspect where a moving obstacle crosses the traveling path of an autonomous moving body in accordance with a first exemplary embodiment of the present invention.
Figure 8A:
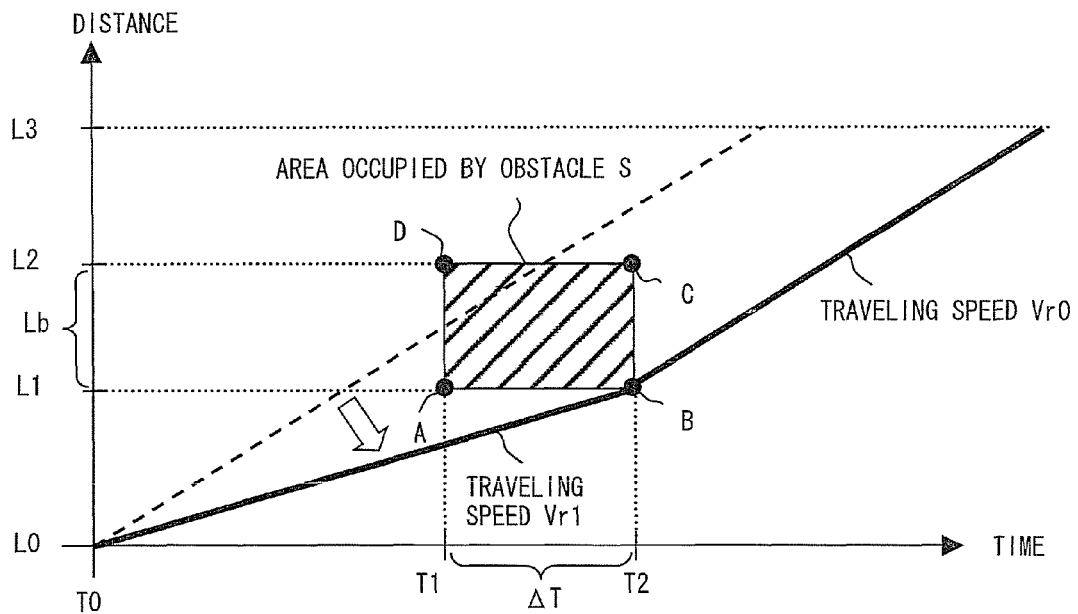
FIGS. 8A and 8B are conceptual diagrams for explaining an aspect where the traveling speed of an autonomous moving body in accordance with a first exemplary embodiment of the present invention is adjusted.
Figure 8B:
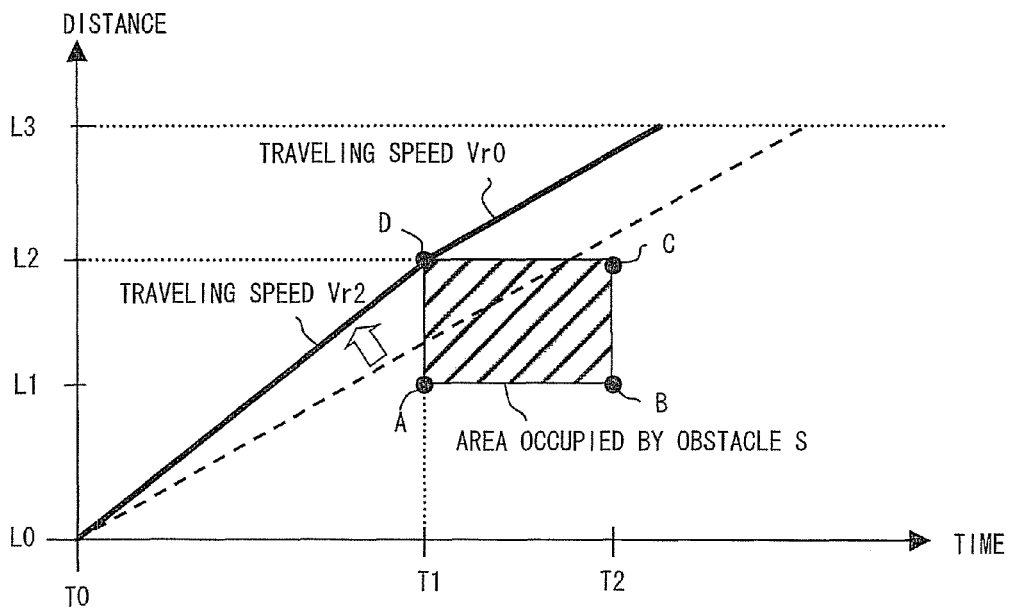
Figure 9:
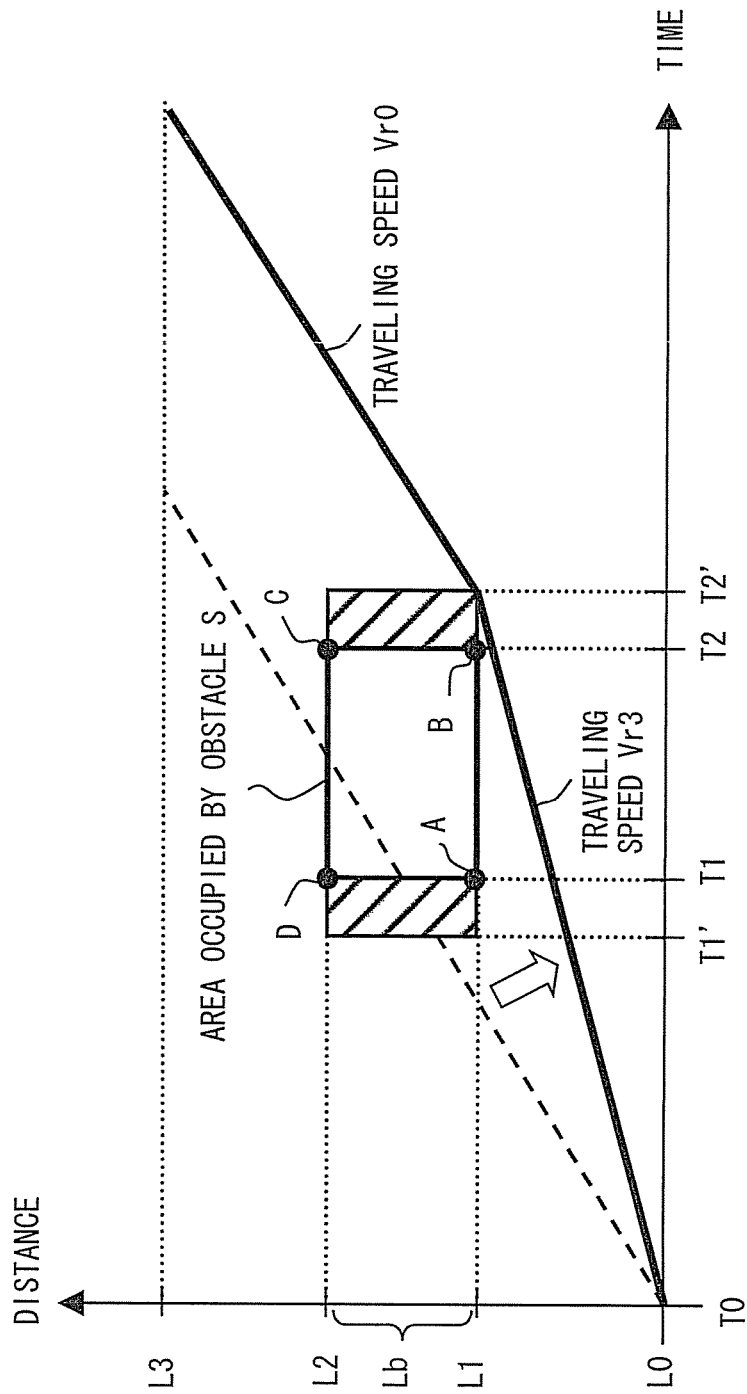
FIG. 9 is a conceptual diagram for explaining an aspect where the traveling speed of an autonomous moving body in accordance with a first exemplary embodiment of the present invention is adjusted.

Next, the calculation method of the traveling speed to avoid a collision with the moving obstacle B is explained with reference to FIGS. 5, 6A, 6B, 7A to 7D, 8A, 8B and 9. FIG. 5 is a flowchart showing traveling speed calculation processing for collision avoidance. FIGS. 6A and 6B are a conceptual diagram showing movement tracks of the moving obstacle B and the autonomous moving body 10. FIGS. 7A to 7D are diagrams for explaining an aspect where the moving obstacle B crosses the traveling path R of the autonomous moving body 10. FIGS. 8A, 8B and 9 are conceptual diagrams for explaining an aspect where the traveling speed of the autonomous moving body 10 is adjusted according to the presence of the moving obstacle B.

Firstly, the control unit 15 defines a time-space coordinate system using the current time/position of the autonomous moving body 10 as a reference (step S201). FIG. 6A shows an example of a time-space coordinate system using the current time/position of the autonomous moving body 10 as the origin point. In the time-space coordinate system shown in the figure, the horizontal axis and the vertical axis represent the elapsed time from the current time and the distance from the current position respectively.

Next, the control unit 15 draws a movement track EX of the autonomous moving body 10 on the time-space coordinate system (step S202). FIG. 6A shows a movement track EX when the autonomous moving body 10 moves at the current speed. Note that the slope of the movement track EX drawn in the figure indicates the current speed of the autonomous moving body 10.

Next, the control unit 15 draws an occupied area S of the moving obstacle B on the time-space coordinate system (step S203). Note that the occupied area S of the moving obstacle B is formed from the time/position at which the moving obstacle B passes through the collision prediction point P. FIG. 6B shows an example of the occupied area S of the moving obstacle B formed from times/positions A to D.

The reason why the occupied area S is drawn like this is explained hereinafter with reference to FIGS. 7A to 7D. In FIGS. 7A to 7D, the explanation is made on the assumption that the travel start point S is a distance L0 and the travel end point G is a distance L3. Firstly, as shown in FIG. 7A, the moving obstacle B has approached to the traveling path R of the autonomous moving body 10 at the moment when a time T0 has elapsed from the current time. Note that in the first exemplary embodiment, the area Rb of the moving obstacle B is defined based on the recognized position of the center of gravity of the moving obstacle B. Specifically, an area Rb that contains the moving obstacle B and has a spare shape with each side of Lb in length is defined.

Figure 7B:
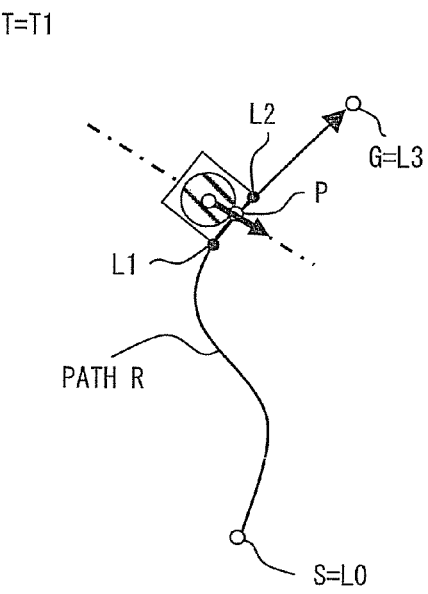

Next, as shown in FIG. 7B, the moving obstacle B arrives at the traveling path R of the autonomous moving body 10 at the moment when a time T1 has elapsed from the current time. At this point, the area Rb of the moving obstacle B comes into contact with the traveling path R at the time T1. That is, at the time T1, the moving obstacle B occupies a portion of the traveling path R from the distance L1 to L2 (indicated by the times/positions A and D shown in FIGS. 6A and 6B).

Figure 7C:
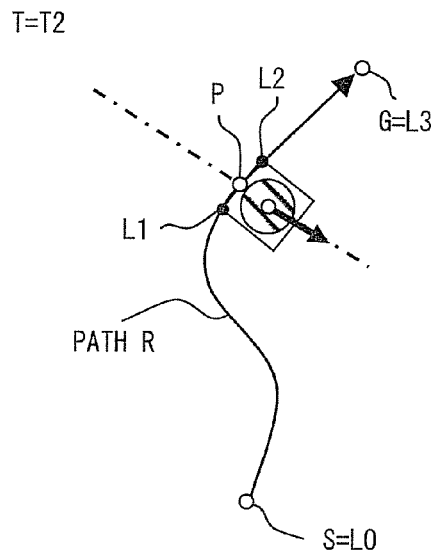

Then, from the state shown in FIG. 7B to the state shown in FIG. 7C (from the time T1 to the time T2), the moving obstacle B has passed the traveling path R of the autonomous moving body 10. During this period, the area Rb of the moving obstacle B has crossed the traveling path R. That is, from the time T1 to the time T2, the moving obstacle B occupies a portion of the traveling path R from the distance L1 to L2 (indicated by the area enclosed by the times/positions A, B, C and D shown in FIGS. 6A and 6B).

Figure 7D:
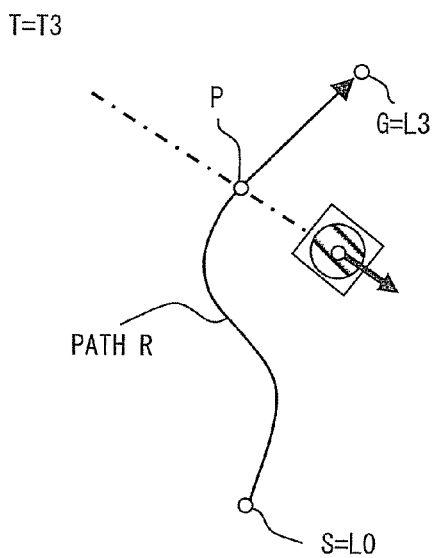

Next, as shown in FIG. 7C, the moving obstacle B has completely passed through the traveling path R of the autonomous moving body 10 at the moment when a time T2 has elapsed from the current time. At this point, the area Rb of the moving obstacle B is detached from the traveling path R at the time T2. That is, at the time T2, the moving obstacle B ceases from occupying the portion of the traveling path R from the distance L1 to L2 (indicated by the times/positions B and C shown in FIGS. 6A and 6B). Then, as shown in FIG. 7D, the moving obstacle B goes away from the traveling path R of the autonomous moving body 10 at the moment when a time T3 has elapsed from the current time.

The explanation is continued by referring to FIG. 5 again. Next, the control unit 15 determines whether or not the movement track EX of the autonomous moving body 10 overlaps the occupied area S of the moving obstacle B (step S204). That is, it is determined whether or not the moving obstacle B passes through the collision prediction point P during the period from when the autonomous moving body 10 arrives at the collision prediction point P to when the autonomous moving body 10 has completely passed through the collision prediction point P. As a result of the determination, if the movement track EX does not overlap the occupied area S, the autonomous moving body 10 continues to move at the current speed without adjusting the traveling speed.

On the other hand, if the movement track EX overlaps the occupied area S in the result of the determination, the control unit 15 adjusts the current speed of the autonomous moving body 10 so that the movement track EX does not overlap the occupied area S (step S205). The traveling speed of the autonomous moving body 10 is adjusted by decreasing or increasing the control signal. An adjusting method of the traveling speed is explained hereinafter with reference to FIGS. 8A and 8B.

FIG. 8A shows a traveling speed when the current speed of the autonomous moving body 10 is decreased in the case the movement track EX of the autonomous moving body 10 overlaps the occupied area S of the moving obstacle B. When the movement track EX of the autonomous moving body 10 overlaps the occupied area S of the moving obstacle B, the autonomous moving body 10 first changes the current speed to a traveling speed Vr1 so that the autonomous moving body 10 decelerates. The traveling speed Vr1 can be calculated from the distance L1 to the collision prediction point P and the time T2 at which the moving obstacle B has completely passed through the collision prediction point P (i.e., the latest time point of the passage time period) (for example, $Vr1=(L1-L0)/(T2-T0)$). In other words, the current speed is decreased to the traveling speed Vr1 so that the movement track EX of the autonomous moving body 10 passes through the time/position B. Further, after the moving obstacle B passed through the traveling path R (i.e., at or after the time T2), the autonomous moving body 10 changes the traveling speed Vr1 to a predetermined traveling speed Vr0 and travels at the traveling speed Vr0. As for the predetermined traveling speed Vr0, a normal traveling speed Vr_max, which is the traveling speed before the deceleration, can be used. For example, by defining the traveling speed Vr_max as the maximum speed at which the autonomous moving body 10 can move, the autonomous moving body 10 can travel at the maximum speed again after avoiding the moving obstacle B, thus enabling the autonomous moving body 10 to move more efficiently to the travel end point.

Meanwhile, FIG. 8B shows traveling speed when the current speed of the autonomous moving body 10 is increased in the case the movement track EX of the autonomous moving body 10 overlaps the occupied area S of the moving obstacle B. When the movement track EX of the autonomous moving body 10 overlaps the occupied area S of the moving obstacle B, the autonomous moving body 10 first changes the current speed to a traveling speed Vr2 so that the autonomous moving body 10 accelerates. The traveling speed Vr2 can be calculated from the distance L2 which is calculated from the collision prediction point P and the size of the moving obstacle B, and the time T1 at which the moving obstacle B starts to pass through the collision prediction point P (i.e., the earliest time point of the passage time period) (for example, $Vr2=(L2-L0)/(T1-T0)$). In other words, the current speed is increased to the traveling speed Vr2 so that the movement track EX of the autonomous moving body 10 passes through the time/position D. Further, after the moving obstacle B passed through the traveling path R (i.e., at or after the time T1), the autonomous moving body 10 changes the traveling speed Vr2 to a predetermined traveling speed Vr0 and travels at the traveling speed Vr0. As for the predetermined traveling speed Vr0, a normal traveling speed Vr_max, which is the traveling speed before the acceleration, can be used.

Further, as shown in FIG. 9, the autonomous moving body 10 may expand the first passage time period according to the degree of the risk of the moving obstacle B at the collision prediction point P, and then adjust the traveling speed. In the example shown in FIG. 9, the time T1 and time T2 are changed to a time T1' and a time T2' respectively.

In the example shown in FIGS. 8A and 8B, since the time period (T1 to T2) during which the moving obstacle B passes through the path R is defined based on the size of the moving obstacle B, the autonomous moving body 10 passes through the vicinity of the moving obstacle B. Therefore, depending on the extent of the measurement error, there is a risk that the autonomous moving body 10 could collide with the moving obstacle B. Accordingly, an additional time period may be provided before and after the time period during which the moving obstacle B passes through the path R to ensure the safety. By doing so, the autonomous moving body 10 and the moving obstacle B can pass each other with a larger temporal margin. That is, by expanding the first passage time period according to the degree of the risk of the moving obstacle, the autonomous moving body 10 can move past the moving obstacle B with a larger margin as they pass each other at the collision prediction point P. Note that the degree of the risk with regard to the moving obstacle B may be determined based on, for example, the range which a moving obstacle (person) feels uncomfortable when the moving obstacle (person) and an autonomous moving body (robot) are closely located within, and/or the size and the moving speed of a moving obstacle B.

As has been explained so far, an autonomous moving body 10 in accordance with the first exemplary embodiment includes means to create a traveling path of the autonomous moving body that extends from a travel start point S to a travel end point G, means to calculate a point at which a moving obstacle B located within the moving area crosses the created traveling path R of the autonomous moving body 10 as a collision prediction point P, means to calculate a first passage time period during which the moving obstacle B passes through the collision prediction point P, and means to calculate a second passage time period during which the autonomous moving body 10 passes through the collision prediction point P. Further, if at least a part of the second passage time period overlaps the first passage time period, the traveling speed of the autonomous moving body 10 is adjusted so that the second passage time period does not overlap the first passage time period.

In this way, a point at which the moving obstacle B crosses the traveling path R of the autonomous moving body 10 is calculated as a collision prediction point P, and the speed of the autonomous moving body 10 is adjusted so that the time period during which the moving obstacle B passes through the collision prediction point P does not overlap the time period during which the autonomous moving body 10 passes through the collision prediction point P. That is, since the autonomous moving body 10 changes its traveling speed so as to avoid the timing at which the moving obstacle B crosses the path, the autonomous moving body 10 can continue to travel along the traveling path R while appropriately avoiding the moving obstacle B at the optimal speed. Therefore, both the obstacle avoidance and the optimal path planning can be achieved simultaneously. Therefore, the autonomous moving body 10 can travel with efficiency toward the travel end point G along the path R while avoiding any collision with the moving obstacle.

Other Exemplary Embodiments

Note that although an example where the autonomous moving body 10 is a two-wheel carriage equipped with a caster 12 is explained in the above-described exemplary embodiment, the present invention is not limited to this example. That is, the autonomous moving body may be a steering type (one-wheel-drive type one steering) vehicle, or may be the so-called inverted-pendulum type two-wheel carriage that travels on a plane surface while controlling the inverted state. Such an inverted-pendulum type two-wheel carriage is not equipped with any caster, but is equipped with an inclination detection unit, such as a gyroscopic sensor, that is used to detect the degree of inclination such as an inclination angle and/or an inclination angle speed with respect to the vertical direction of the vehicle main body. Further, it can travel by a program stored in a storage area (memory) provided inside a control unit. The program supplies outputs to the driving unit to drive the wheels so that the vehicle moves while maintaining the inverted state of the vehicle main body based on control signals used to move the vehicle.

Further, examples of the autonomous moving body are not limited to two-wheel type vehicles like the ones described above. That is, examples of the autonomous moving body include various types of vehicles such as four-wheel type vehicles with two front wheels and two rear wheels. In particular, in the case of moving bodies that move by wheels, they cannot move in the axial direction of the wheels (direction perpendicular to the traveling direction). Therefore, by applying a traveling path creation method in accordance with the present invention, they can accurately arrive at the travel end point (destination) along a smooth path.

Further, examples of the above-described autonomous moving body are not limited to vehicles. That is, the present invention is also applicable to walking robots that perform walking using legs. In particular, in the gait control of a walking robot, autonomous traveling can be performed while preventing the walking robot from performing walking or traveling along a larger curvature as much as possible. Therefore, it is possible to simplify the control required to perfume stable walking as much as possible.

Further, although the autonomous moving body 10 recognizes its own position by receiving position information from a GPS or the like in the above-described exemplary embodiment, the present invention is not limited to this example. That is, the autonomous moving body 10 may recognize its own position by calculating a traveling distance and a traveling direction from an already-known point based on the driving amount, the moving direction, and the like of the wheels. In such a case, one or a plurality of markers or the likes that provide position information may be provided within the area defined as the moving area where an autonomous moving body moves. Then, when the autonomous moving body moves above the marker, the autonomous moving body may read position information stored in the marker by a read mit provided in the autonomous moving body.

Further, instead of storing the grid map in the autonomous moving body side (storage area of control unit) as described above, the grid map may be stored in the control unit side. That is, the above-described grid map may be stored as data in a storage area, such as a memory and a HDD, that is provided within the control unit used to control the autonomous moving body, and a traveling path may be created by using the stored data.

Note that the present invention is not limited to above-described exemplary embodiments, and needless to say, various modifications can be made without departing from the spirit and the scope of the present invention.

INDUSTRIAL APPLICABILITY

The present invention can be applied to autonomous moving bodies that avoid a moving obstacle, their control methods, and control systems.

The invention claimed is:

1. An autonomous moving body that starts traveling from a travel start point located within a moving area and arrives at a travel end point located within the moving area, comprising a control unit programmed to:
    define a traveling path of the autonomous moving body, the traveling path extending from the travel start point to the travel end point;
    calculate a collision prediction point, the collision point being a point at which a moving obstacle located within the moving area crosses the traveling path of the autonomous moving body;
    define a time-space coordinate system in which an elapsed time from a current time is indicated on a horizontal axis and a distance from a current position of the autonomous moving body along the traveling path is indicated on a vertical axis;
    draw a movement track of the autonomous moving body on the time-space coordinate system;
    determine, when the moving obstacle passes through the collision prediction point, four time-space coordinates on the time-space coordinate system, the four time-space coordinates defining a square-shaped temporal-spatial area containing the moving obstacle;
    determine if the movement track overlaps the square-shaped temporal-spatial area; and
    adjust, if the movement track overlaps the square-shaped temporal-spatial area, a traveling speed of the autonomous moving body by either decreasing the traveling speed so that the movement track passes through time-space coordinate at which the square-shaped temporal-spatial area has completely passed the traveling path and whose value on the vertical axis is smaller than that of the four time-space coordinates, or increasing the traveling speed so that the movement track passes through another time-space coordinate at which the square-shaped temporal-spatial area starts to pass the traveling path and whose value on the vertical axis is larger than that of the four time-space coordinates.

2. The autonomous moving body according to claim 1, wherein, after the square-shaped temporal-spatial area has completely passed through the traveling path, the control unit is programmed to change the traveling speed from the adjusted traveling speed to a predetermined traveling speed.

3. The autonomous moving body according to claim 1, wherein the control unit is further programmed to:
   calculate a movement prediction path of the moving obstacle based on a current position information and a movement direction information of the moving obstacle; and
   calculate an intersection point of the traveling path of the autonomous moving body and the calculated movement prediction path of the moving obstacle as the collision prediction point.

4. A control method of an autonomous moving body that starts traveling from a travel start point located within a moving area and arrives at a travel end point located within the moving area, the control method comprising:
   defining a traveling path of the autonomous moving body, the traveling path extending from the travel start point to the travel end point;
   calculating a collision prediction point, the collision point being a point at which a moving obstacle located within the moving area crosses the traveling path of the autonomous moving body;
   defining a time-space coordinate system in which an elapsed time from a current time is indicated on a horizontal axis and a distance from a current position of the autonomous moving body along the traveling path is indicated on a vertical axis;
   drawing a movement track of the autonomous moving body on the time-space coordinate system;
   determining, when the moving obstacle passes through the collision prediction point, four time-space coordinates on the time-space coordinate system, the four time-space coordinates defining a square-shaped temporal-spatial area containing the moving obstacle;
   determining if the movement track overlaps the square-shaped temporal-spatial area;
   adjusting, if the movement track overlaps the square-shaped temporal-spatial area, a traveling speed of the autonomous moving body by either decreasing the traveling speed so that the movement track passes through a time-space coordinate at which the square-shaped temporal-spatial area has completely passed the traveling path and whose value on the vertical axis is smaller than that of the four time-space coordinates, or increasing the traveling speed so that the movement track passes through another time-space coordinate at which the square-shaped temporal-spatial area starts to pass the traveling path and whose value on the vertical axis is larger than that of the four time-space coordinates.

5. The control method of an autonomous moving body according to claim 4, wherein, after the square-shaped temporal-spatial area has completely passed through the traveling path, the adjusted traveling speed is changed to a predetermined traveling speed.

6. An autonomous moving body that starts traveling from a travel start point located within a moving area and arrives at a travel end point located within the moving area, comprising:
   a control unit that
      defines a traveling path of the autonomous moving body, the traveling path extending from the travel start point to the travel end point,
      calculates a collision prediction point, the collision point being a point at which a moving obstacle located within the moving area crosses the traveling path of the autonomous moving body,
      defines a time-space coordinate system in which an elapsed time from a current time is indicated on a horizontal axis and a distance from a current position of the autonomous moving body along the traveling path is indicated on a vertical axis,
      draws a movement track of the autonomous moving body on the time-space coordinate system,
      determines, when the moving obstacle passes through the collision prediction point, four time-space coordinates on the time-space coordinate system, the four time-space coordinates defining a square-shaped temporal-spatial area containing the moving obstacle;
      determines if the movement track overlaps the square-shaped temporal-spatial area, and
      adjusts, if the movement track overlaps the square-shaped temporal-spatial area, a traveling speed of the autonomous moving body by either decreasing the traveling speed so that the movement track passes through a time-space coordinate at which the square-shaped temporal-spatial area has completely passed the traveling path and whose value on the vertical axis is smaller than that of the four time-space coordinates, or increasing the traveling speed so that the movement track passes through another time-space coordinate at which the square-shaped temporal-spatial area starts to pass the traveling path and whose value on the vertical axis is larger than that of the four time-space coordinates.

\* \* \* \* \*